United States Patent
Edge

(10) Patent No.: US 9,485,794 B2
(45) Date of Patent: Nov. 1, 2016

(54) METHODS AND APPARATUS FOR USING DEVICE TO DEVICE COMMUNICATIONS TO SUPPORT IMS BASED SERVICES

(71) Applicant: QUALCOMM Incorporated, San Diego, CA (US)

(72) Inventor: Stephen W. Edge, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 13/727,037

(22) Filed: Dec. 26, 2012

(65) Prior Publication Data

US 2013/0315079 A1   Nov. 28, 2013

Related U.S. Application Data

(60) Provisional application No. 61/650,951, filed on May 23, 2012.

(51) Int. Cl.
*H04W 76/02* (2009.01)
*H04W 4/02* (2009.01)
(Continued)

(52) U.S. Cl.
CPC ........ *H04W 76/023* (2013.01); *H04L 65/1016* (2013.01); *H04L 67/12* (2013.01); *H04W 4/02* (2013.01); *H04W 8/005* (2013.01)

(58) Field of Classification Search
CPC . H04W 76/023; H04W 72/04; H04W 52/02; H04Q 7/26; H04Q 7/20; H04B 7/26; G06F 15/16; G08B 1/08; H04L 61/2564
USPC ................. 370/252, 328; 455/426
See application file for complete search history.

(56) References Cited

U.S. PATENT DOCUMENTS 8,294,569 B2   10/2012   Thorn et al.
8,335,473 B2   12/2012   Liao
(Continued)

FOREIGN PATENT DOCUMENTS

WO   WO-2004103008 A1   11/2004
WO   WO-2005091573 A1   9/2005
(Continued)

OTHER PUBLICATIONS

Lin et al., An overview of 3GPP Device-toDevice Proximity Services, Apr. 2014, IEEE Comunications Magazine, pp. 40-48.*
(Continued)

*Primary Examiner* — Chi H Pham
*Assistant Examiner* — Shailendra Kumar
(74) *Attorney, Agent, or Firm* — James K. O'Hare

(57) ABSTRACT

A method, an apparatus, and a computer program product for wireless communication are provided in connection with using D2D communications to support at least a portion of IMS based services. In one example, a first UE is equipped to perform communications with a second UE using an IMS session in which data traffic and signaling traffic are supported through a network, determine that the second UE is within a first proximity threshold of the first UE, establish a D2D communication link with the second UE, and transfer support of the data traffic to the D2D communication link while maintaining the support of the signaling traffic through the network. In an aspect, the first proximity threshold may be a distance, a signaling strength or a signaling quality between the first and second UEs between which D2D communications are supported.

36 Claims, 13 Drawing Sheets

(51) Int. Cl.
*H04L 29/06* (2006.01)
*H04L 29/08* (2006.01)
*H04W 8/00* (2009.01)

(56) References Cited

U.S. PATENT DOCUMENTS

| | | |
|---|---|---|
| 2006/0267841 A1 | 11/2006 | Lee et al. |
| 2008/0045235 A1 | 2/2008 | Kennedy et al. |
| 2009/0076911 A1 | 3/2009 | Vo et al. |
| 2010/0009675 A1* | 1/2010 | Wijting ............... H04W 72/02 455/426.1 |
| 2010/0014443 A1 | 1/2010 | Cristian et al. |
| 2010/0177681 A1 | 7/2010 | Sahinoglu |
| 2011/0149779 A1 | 6/2011 | Richards et al. |
| 2011/0182280 A1 | 7/2011 | Charbit et al. |
| 2012/0044815 A1 | 2/2012 | Geirhofer et al. |
| 2012/0179829 A1* | 7/2012 | George ............... H04L 61/2564 709/227 |
| 2012/0201158 A1 | 8/2012 | Geirhofer et al. |
| 2013/0170414 A1* | 7/2013 | Kwon ............... H04W 72/042 370/311 |
| 2013/0303160 A1* | 11/2013 | Fong ............... H04W 76/048 455/426.1 |
| 2013/0308551 A1* | 11/2013 | Madan et al. ............... 370/329 |
| 2013/0316727 A1 | 11/2013 | Edge |

FOREIGN PATENT DOCUMENTS

| | | | |
|---|---|---|---|
| WO | 2011147468 A1 | 12/2011 | |
| WO | 2012038445 A1 | 3/2012 | |
| WO | 2012061993 A1 | 5/2012 | |
| WO | WO2013052163 | * 11/2013 | ............... H04B 7/26 |

OTHER PUBLICATIONS

3GPP TS 23.303 v12.2.0 Technical Specification, 3rd Generation Partnership Project; Technical Specification, Group Services and System Aspects; Proximity-based services (ProSe); Stage 2 (Release 12), Sep. 2014.*

Rosenberg et al., SIP: Session Initiation Protocol, Jun. 2002, IETF, RFC 3261.*

Doppler, et al., "Device-top-Device Communication as an Underlay to LTE-Advanced Networks", Communications Magazine, IEEE Dec. 2009, vol. 47, Issue 12, pp. 42-49.

Intel: "Operator Managed and Operator Assisted D2D", 3GPP Draft; S1-120063-Managed or Assisted D2D. 3rd Generation Partnership Project (3GPP), Mobile Competence Centre; 650, Route Des Lucioles; F-06921, Sophia-Antipolis Cedex; France, vol. SA WG1, no.Kyoto, Japan; 20120213-20120217, Feb. 6, 2012 (Feb. 6, 2012), XP050574728.

International Search Report and Written Opinion—PCT/US2013/042510—ISA/EPO—Sep. 13, 2013.

NEC: "ProSe IMS Architecture", 3GPP DRAFT; S2-131035, 3rd Generation Partnership Project (3GPP), Mobile Competence Centre; 650, Route Des Lucioles; F-06921 Sophia-Antipolis Cedex; France, vol. SA WG2, no.San Diego, California, USA; 20130408-20130412, Apr. 2, 2013 (Apr. 2, 2013), XP050708265.

* cited by examiner

METHODS AND APPARATUS FOR USING DEVICE TO DEVICE COMMUNICATIONS TO SUPPORT IMS BASED SERVICES

CLAIM OF PRIORITY UNDER 35 U.S.C. §119

The present application for patent claims priority to Provisional Application No. 61/650,951 entitled "DEVICE TO DEVICE LOCATION" filed May 23, 2012, and assigned to the assignee hereof and hereby expressly incorporated by reference herein.

BACKGROUND

1. Field

The present disclosure relates generally to communication systems, and more particularly, to using device-to-device (D2D) communications as part of an internet protocol (IP) multimedia subsystem (IMS) communications.

2. Background

Wireless communication systems are widely deployed to provide various telecommunication services to mobile users such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide common services that enable different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication (e.g., LTE-Direct) between end user mobile devices such as mobile phones, smartphones, laptops, tablets etc. Such D2D communication would not need transport via a network and can thus reduce signaling, bandwidth and processing load on networks.

Services provided by wireless communication systems can include the ability to make and receive calls including voice calls and the ability to send and receive data including data transmitted using the Internet Protocol (IP). To make and receive voice calls with efficient usage of network resources (e.g., wireless spectrum and wireline signaling and transmission lines), networks and terminals may support Voice over IP (VoIP) for calls. Networks that support radio access according to 3GPP and 3GPP2 standards (which includes networks that employ GSM, WCDMA, cdma2000, EvDO, and LTE) may employ a solution in which support is provided using the IMS. IMS based communications use network based entities to aid and/or manage various functions and have been standardized by 3GPP for various radio access technologies including LTE.

Currently, when implemented in an access network, D2D communications allow for offloading of resources from network support to communications that may occur directly between devices. Because IMS based communications use network based entities to aid and/or manage various functions, the communications may not be able to fully function if handed off to D2D communications.

As the demand for D2D communications increases, there may exist a need for methods/apparatuses for using D2D communications to support at least a portion of IMS based services.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with using D2D communications to support at least a portion of IMS based services. In one example, a first UE is equipped to perform communications with a second UE using an IMS session in which data traffic and signaling traffic are supported through a network, determine that the second UE is within a first proximity threshold of the first UE, establish a D2D communication link with the second UE, and transferring support of the data traffic to the D2D communication link while maintaining the support of the signaling traffic through the network. In an aspect, the first proximity threshold may be a distance between the first and second UEs within which D2D communications are supported.

According to related aspects, a method for using D2D communications to support at least a portion of IMS based services is provided. The method can include performing, by a first UE, communications with a second UE using an IMS session in which data traffic and signaling traffic are supported through a network. Further, the method can include determining that the second UE is within a first proximity threshold of the first UE. In an aspect, the first proximity threshold may be a distance between the first and second UEs within which D2D communications are supported. Further, the method can include establishing a D2D communication link with the second UE. Moreover, the method may include transferring support of the data traffic to the D2D communication link while maintaining the support of the signaling traffic through the network.

Another aspect relates to a communications apparatus for using D2D communications to support at least a portion of IMS based services. The communications apparatus can include means for performing, by a first UE, communications with a second UE using an IMS session in which data traffic and signaling traffic are supported through a network. Further, the communications apparatus can include means for determining that the second UE is within a first proximity threshold of the first UE. In an aspect, the first proximity threshold may be a distance between the first and second UEs within which D2D communications are supported.

Further, the communications apparatus can include means for establishing a D2D communication link with the second UE. Moreover, the communications apparatus can include means for transferring support of the data traffic to the D2D communication link while maintaining the support of the signaling traffic through the network.

Another aspect relates to a communications apparatus. The apparatus can include a processing system configured to perform, by a first UE, communications with a second UE using an IMS session in which data traffic and signaling traffic are supported through a network. Further, the processing system may be configured to determine that the second UE is within a first proximity threshold of the first UE. In an aspect, the first proximity threshold may be a distance between the first and second UEs within which D2D communications are supported. Further, the processing system may be configured to establish a D2D communication link with the second UE. Moreover, the processing system may further be configured to transfer support of the data traffic to the D2D communication link while maintaining the support of the signaling traffic through the network.

Still another aspect relates to a computer program product, which can have a computer-readable medium including code for performing, by a first UE, communications with a second UE using an IMS session in which data traffic and signaling traffic are supported through a network. Further, the computer-readable medium can include code for determining that the second UE is within a first proximity threshold of the first UE. In an aspect, the first proximity threshold may be a distance between the first and second UEs within which D2D communications are supported. Further, the computer-readable medium can include code for establishing a D2D communication link with the second UE. Moreover, the computer-readable medium can include code for transferring support of the data traffic to the D2D communication link while maintaining the support of the signaling traffic through the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
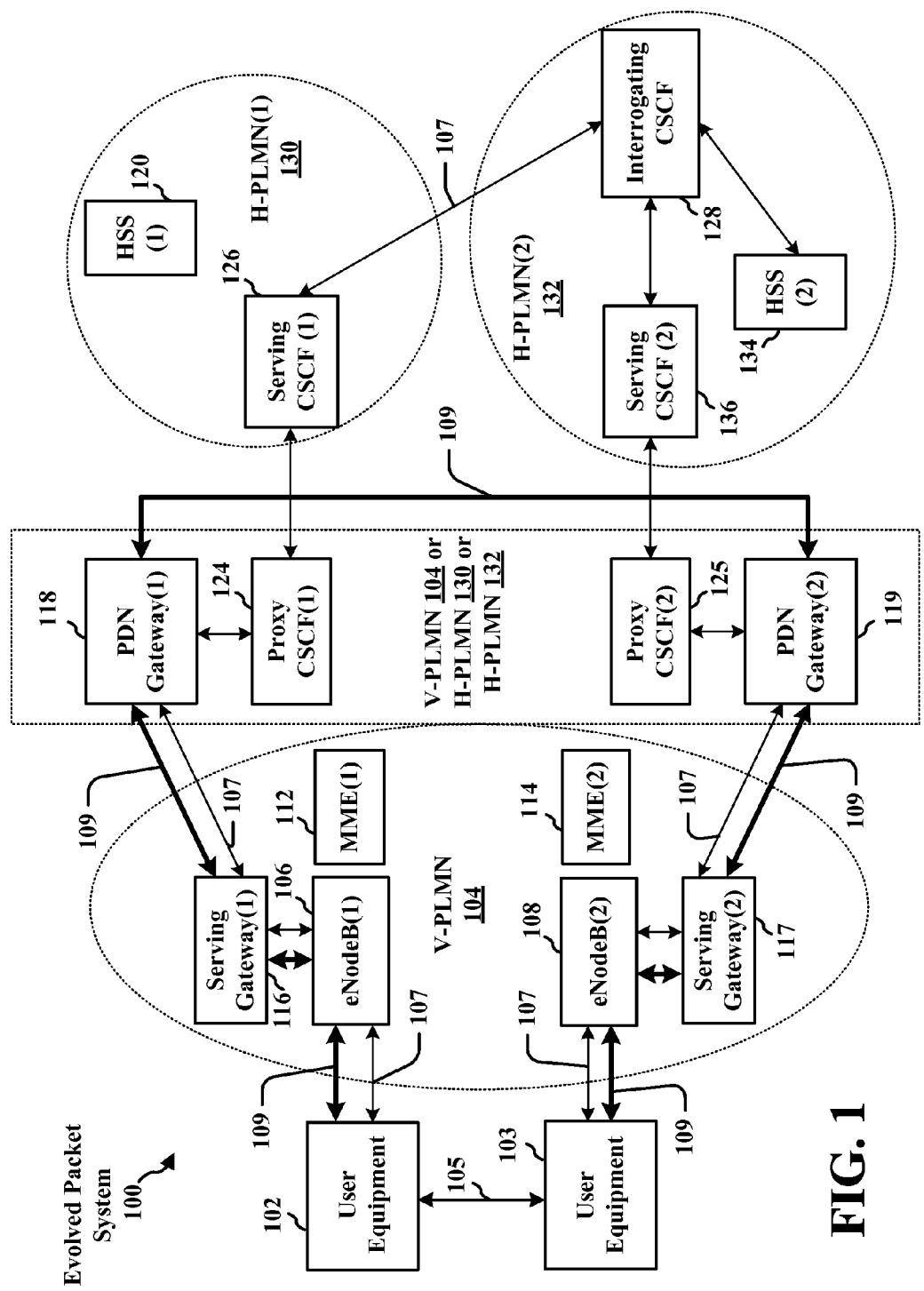
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a network architecture 100. The network architecture 100 may be referred to as an Evolved Packet System (EPS). In an aspect, the network architecture may support LTE communications. The network architecture 100 may include one or more user equipments (UEs) 102, 103, and may be supported through one or more Public Land Mobile Networks (PLMNs) (e.g., visitor PLMN (V-PLMN) 104, home PLMN (H-PLMN) 130, 132). The EPS can interconnect with other access networks and core networks not shown in FIG. 1—for example a UMTS access network or an IP core network. As shown, the EPS provides packet-switched services, however, as those skilled in the art will readily appreciate, the various concepts presented throughout this disclosure may be extended to networks providing circuit-switched services.

A V-PLMN 104 may support UEs 102 and 103 and may include the evolved Node B (eNodeB) (1) 106 and eNodeB (2) 108. The terms "evolved Node B", "eNodeB" and "eNB" are used synonymously herein. Each UE 102, 103 may be supported by different eNBs 106, 108 or by the same eNB 106 or 108 (not shown in FIG. 1). The eNB(1) 106 may provide user and control planes protocol terminations toward the UE 102, and eNB(2) may provide user and control planes protocol terminations toward the UE 103. The eNB(1) 106 may be connected to the eNB(2) 108 via a backhaul (e.g., an X2 interface). The eNB(1) 106 may also be referred to as a base station, a base transceiver station, a radio base station, a radio transceiver, a transceiver function, a basic service set (BSS), an extended service set (ESS), or some other suitable terminology. The eNBs 106, 108 each provide an access point for a UE 102, 103 to an evolved packet center (EPC). Further, the UEs 102, 103 may communication directly between each other using D2D communications 105 when the UEs are sufficiently close together. In an aspect, D2D communications may be supported using LTE Direct protocols (e.g., D2D communications in an LTE access network). Examples of UEs 102, 103 include a cellular phone, a smart phone, a session initiation protocol (SIP) phone, a laptop, a tablet, a personal digital assistant (PDA), a satellite radio, a global positioning system, a multimedia device, a video device, a digital audio player (e.g., MP3 player), a camera, a game console, or any other similar functioning device. The UE 102 and 103 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB(1) 106 is connected by an Si interface to the EPC (not distinguished in FIG. 1) which includes a Mobility Management Entity (MME)(1) 112, MME(2) 114, Serving Gateway(1) 116, serving Gateway(2) 117, Packet Data Network (PDN) Gateway(1) 118, and PDN gateway(2) 119. The MMEs 112, 114 are the control nodes that process the signaling between the UEs 102, 103 and the EPC. MMEs 112 and 114 may be different MMEs (as shown in FIG. 1) or the same MME (not shown in FIG. 1). Generally, the MMEs 112, 114 manage network attachment and detachment for served UEs (such as UEs 102 and 103) and bearer and connection establishment and release. For UE(1) 102, all user IP packets are transferred through the Serving Gateway(1) 116, which itself is connected to the PDN Gateway(1) 118. The PDN Gateway(1) 118 provides UE IP address allocation as well as other functions such as packet routing. The PDN Gateway(1) 118 may also be connected to an Operator's IP Services, such as but not limited to, the Internet, the Intranet, an IMS, and a PS Streaming Service (PSS). UE(2) 103 is similarly served by Serving Gateway(2) 117 and PDN Gateway(2) 119. Serving Gateways 116 and 117 may be different (as shown in FIG. 1) or the same (not shown in FIG. 1). PDN Gateways 118 and 119 may also be different (as shown in FIG. 1) or the same (not shown in FIG. 1).

In an aspect in which IMS services are supported, each UE 102 and 103 may be supported by a H-PLMN 130 and 132, respectively, while operating in V-PLMN 104. H-PLMN 130 may be the home network for UE 102, while H-PLMN 132 may be the home network for UE 103. V-PLMN 104, H-PLMN 130 and H-PLMN 132 may be different PLMNs as shown in FIG. 1 or two or all three of them may be the same PLMN (not shown in FIG. 1). H-PLMNs 130, 132 may include home subscriber servers (HSSs) 120, 134, serving call server control functions (S-CSCFs), 126, 136, and one or more interrogating call server control functions (I-CSCFs) 128. While operating in V-PLMN 104, UEs 102, 103 may use PDN Gateways 118, 119 to communicate with their respective H-PLMNs 130, 132 through proxy CSCFs (P-CSCFs) 124, 125. PDN Gateway 118 and P-CSCF 124 may be located either in V-PLMN 104 or H-PLMN 130. Likewise, PDN Gateway 119 and P-CSCF 125 may be located either in V-PLMN 104 or H-PLMN 132. P-CSCFs 124 and 125 may be different P-CSCFs (as shown in FIG. 1) or may be the same P-CSCF (not shown in FIG. 1)—e.g., when two or more of V-PLMN 104, H-PLMN 130 and H-PLMN 132 are the same PLMN. S-CSCFs 126 and 136 may be different S-CSCFs (as shown in FIG. 1) or may be the same S-CSCF (not shown in FIG. 1)—e.g., when H-PLMN 130 and H-PLMN 132 are the same PLMN.

In an operational aspect, a UE pair 102, 103 (associated with a V-PLMN 104) may establish an IMS session through H-PLMNs 130, 132. An IMS session may include data traffic 109 and signaling traffic 107 (e.g., Session Initiation Protocol (SIP) signaling). Data traffic 109 may be routed between UEs 102 and 103 via eNB 106, Serving Gateway (SWG) 116, PDN Gateway (PDG) 118, some IP connection (e.g., routers not shown in FIG. 1) between PDN Gateways 118 and 119, PDN Gateway 119, Serving Gateway 117 and eNB 108. Signaling traffic 107 may be routed between UEs 102 and 103 via eNB 106, Serving Gateway 116, PDN Gateway 118, P-CSCF 124, S-CSCF 126, I-CSCF 128, S-CSCF 136, P-CSCF 125, PDN Gateway 119, Serving Gateway 117 and eNB 108. Additionally, the UE pair 102, 103 may establish a D2D communication link 105. Subsequently, the UE pair 102, 103 may transfer data traffic 109 support to the D2D communication link 105. SIP signaling 107 may remain supported (anchored) in the network. In such an aspect, SIP signaling 107 bandwidth usage is relatively low and the signaling is used to enable other parties to join and/or leave a SIP session. Further description of data traffic 109 and signaling traffic 107 handling is provided with reference to FIG. 7.

A V-PLMN 104 and/or H-PLMN 130, 132 may coordinate D2D communication (e.g., assist in establishing the D2D communication link 105), control use of D2D mode versus network mode, provide security support, etc. As used herein, D2D mode may refer to direct communication between two or more UEs 102, 103, and network mode may refer to communication between two or more UEs 102, 103 via the network. In an aspect, the two or more UEs 102, 103 establish the D2D mode autonomously. In such an aspect, initial discovery and establishment of the D2D communication link 105 may be based on an ability to communicate signals directly between UEs. Alternatively or in the alternative for UEs attached to a network that does not support D2D mode but where D2D mode is permitted, UEs may connect via the network and exchange serving cell and location information to determine possible D2D mode. Once D2D mode is in progress, one or more of the UEs may monitor their relative locations. A group of three or more UEs may enter D2D mode whereby some or all pairs of UEs in the group maintain direct D2D communication between one another and whereby some UEs in the group may act as relays to relay D2D communication between other UEs in the group. For example, one UE designated A in the group may maintain direct D2D communication with each of two other UEs in the group designated B and C and enable UEs B and C to communicate indirectly via D2D communication by acting as a relay. In this example, UE A may relay communication received from UE B to UE C and may relay communication received from UE C to UE B. A group of UEs employing D2D communication between one another may monitor their relative locations and assign and reassign the role of being a relay to any UE based on the current relative locations of the UEs. Returning to FIG. 1, in another aspect, the network may assist the two or more UEs 102, 103 to enter the D2D mode. In such an aspect, the network mode may not be available and/or possible—e.g., if the network is congested or if portions of the network have temporarily failed or do not provide continuous radio coverage to both UEs 102 and 103. In another aspect, the network (e.g., one or more network entities) may control entry to D2D mode and support handover between D2D mode and network mode.

Figure 2:
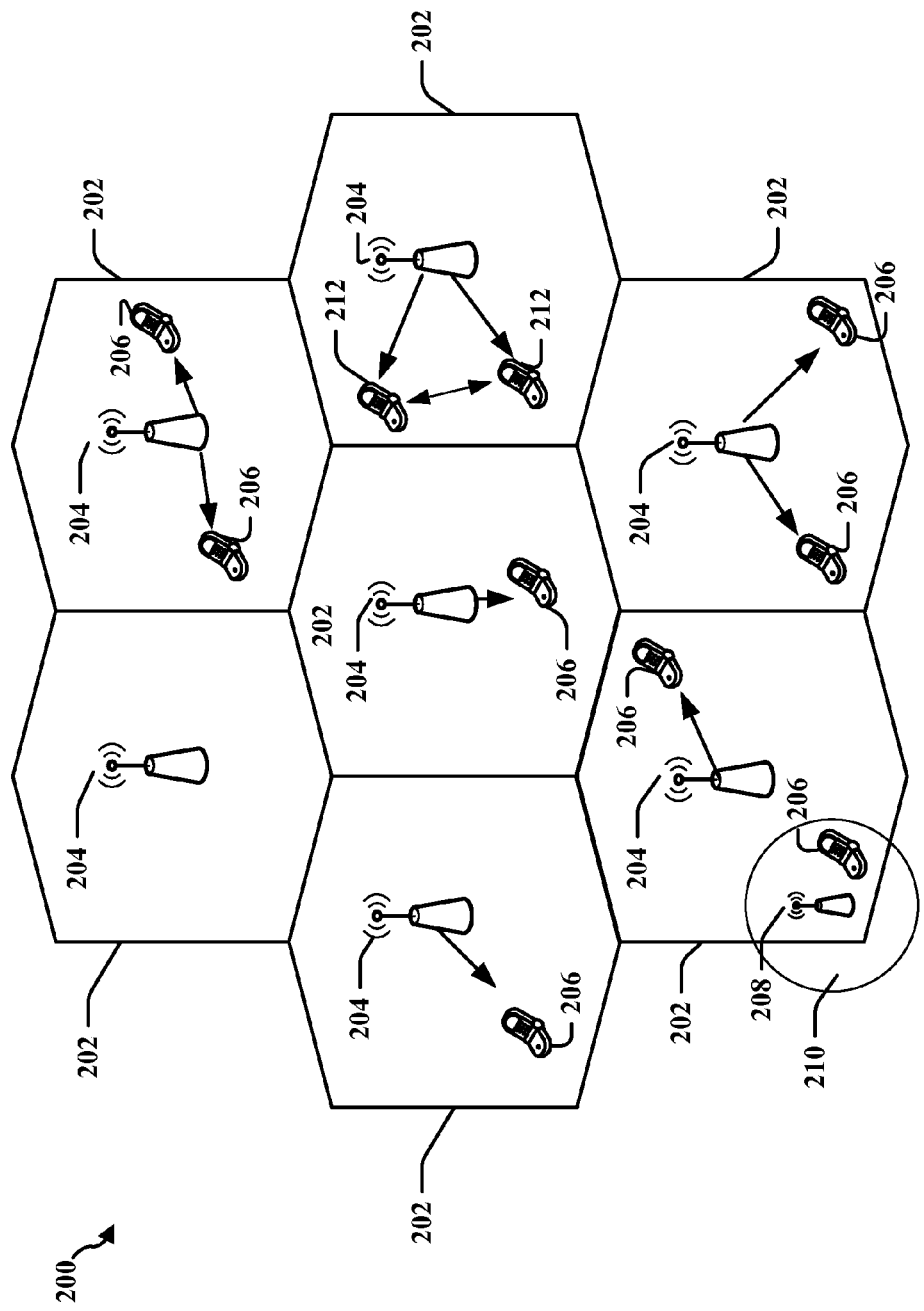
FIG. 2 is a diagram illustrating an example of an access network.

FIG. 2 is a diagram illustrating an example of an access network 200 in an LTE network architecture. Access network 200 may be part of V-PLMN 104 in FIG. 1 and may include eNBs 106 and 108. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116 or 117.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
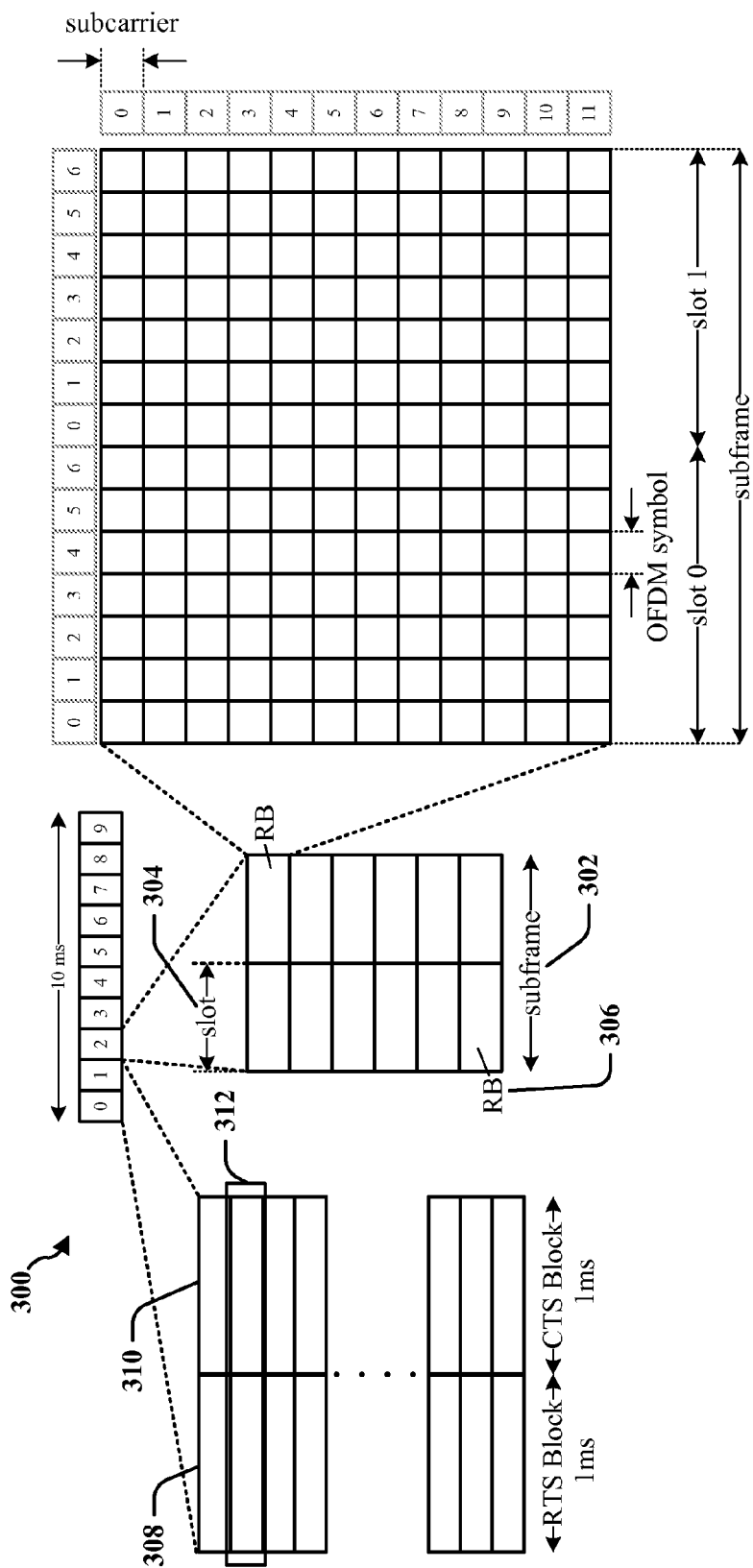
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames 302. Each sub-frame 302 may include two consecutive time slots 304. A resource grid may be used to represent two time slots, each time slot including a resource block (RB) 306. In LTE, the resource grid may be divided into multiple resource elements. Further, in LTE, a RB 306 may contain 12 consecutive subcarriers in the frequency domain and, for a normal cyclic prefix in each OFDM symbol, 7 consecutive OFDM symbols in the time domain, or 84 resource elements. For an extended cyclic prefix, a resource block may contain 6 consecutive OFDM symbols in the time domain and may have 72 resource elements. A physical DL control channel (PDCCH), a physical DL shared channel (PDSCH), and other channels may be mapped to the resource elements.

In LTE-Direct (e.g., D2D communications in an LTE environment and as applicable to D2D communications link 105 in FIG. 1), scheduling of D2D communication links may be performed through distributed scheduling. In an aspect, a request to send (RTS)/clear to send (CTS) handshake signaling may be performed before each device in a D2D pair attempts to communicate data over a D2D communications link. In LTE-Direct, 24 RBs may be available for RTS/CTS signaling. Further, in LTE-Direct, a RB may be assigned as a RTS block 308 and another RB may be assigned as a CTS block 310 for each D2D communication link. In other words, each D2D communication link may use a RB pair for RTS/CTS signaling. As used herein, the RB pair may be referred to as a connection identifier (CID) 312.

Figure 4:
FIG. 4 is a diagram illustrating an example of an UL frame structure in LTE.

FIG. 4 is a diagram 400 illustrating an example of an uplink (UL) frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure may result in the data section including contiguous subcarriers, which may allow a single UE to be assigned all of the contiguous subcarriers in the data section.

A UE may be assigned resource blocks 410a, 410b in the control section to transmit control information to an eNB.

The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 may carry a random sequence and may not carry any UL data/signaling. In an aspect, a RACH sequence may be reserved for communications of ACK/NACK information from a UE while in idle mode. Each random access preamble may occupy a bandwidth corresponding to six consecutive resource blocks. The starting frequency may be specified by the network. That is, the transmission of the random access preamble may be restricted to certain time and frequency resources. There may be no frequency hopping for the PRACH. The PRACH attempt may be carried in a single subframe (1 ms) or in a sequence of few contiguous subframes and a UE may make only a single PRACH attempt per frame (10 ms).

Figure 5:
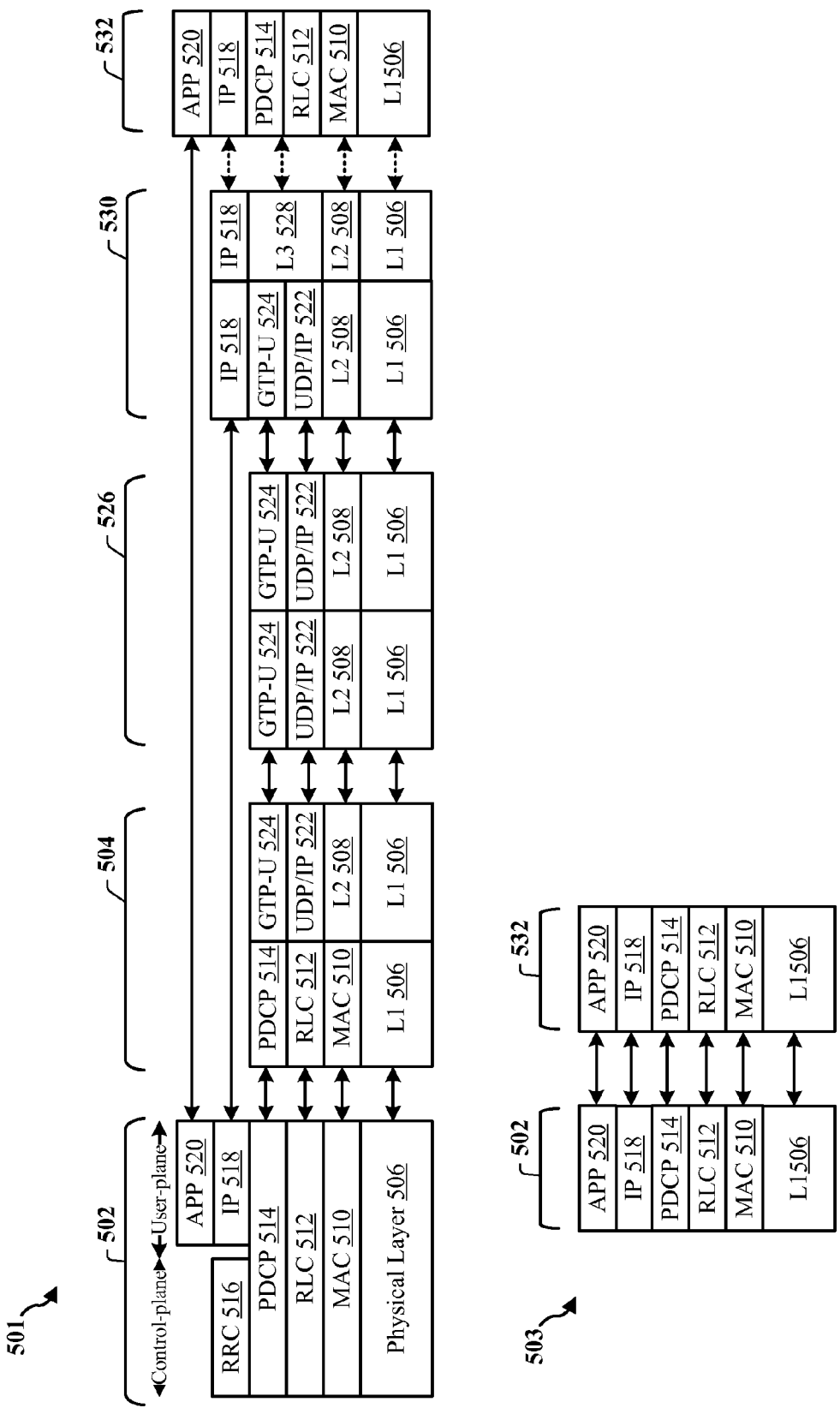
FIG. 5 is a diagram illustrating an example of a radio protocol architecture for the user and control planes.

FIG. 5 is a diagram illustrating an example of a radio protocol architecture 501 for the user and control planes in LTE to support radio communication between a UE 502, UE 532, via eNB 504, SWG 526, and PDG 530 (e.g., data path 109 in FIG. 1). Further, as depicted in FIG. 1, signaling may occur between an eNB, SWG, and PDG supporting UE 532 (not shown). UE 502 may correspond to UE 102 and UE 532 may correspond to UE 103 in FIG. 1. eNB 504 may correspond to eNB 106 in FIG. 1. SWG 526 may correspond to SWG 116 in FIG. 1. PDG 530 may correspond to PDG 118 in FIG. 1. Further entities may be present that are not shown in FIG. 5 that convey user plane signaling between PDG 530 and UE 532, such as an eNB that may correspond to eNB 108 in FIG. 1, an SWG that may correspond to SWG 117 in FIG. 1 and a PDG that may correspond to PDG 119 in FIG. 1.

The radio protocol architecture for the 502 UE and the 504 eNB is shown with three layers: Layer 1, Layer 2, and Layer 3. Communication of data/signaling may occur between UE 502 and eNB 504 across the three layers. Layer 1 506 (L1 layer) is the lowest layer and implements various physical layer signal processing functions. The L1 layer may also be referred to as the physical layer 506. Layer 2 (L2 layer) is above the physical layer 506 and is responsible for the link between the UE 502 and eNB 504 over the physical layer 506.

In the user plane associated with UE 502, the L2 layer includes a media access control (MAC) sublayer 510, a radio link control (RLC) sublayer 512, and a packet data convergence protocol (PDCP) 514 sublayer, which are terminated at the eNB on the network side. The UE 502 may have several upper layers above the L2 layer 508 including a network layer (e.g., IP layer) that may correspond to a layer 3 and that is terminated at the PDG 530 on the network side, and an application layer 520 that is terminated at the other end of the connection (e.g., far end UE 532, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations. In an operational aspect, user plane signaling from UE 502 (e.g. MAC 510 layer signaling, RLC 512 layer signaling and PDCP 514 layer signaling) may be conveyed across the network using other protocol layers such as some level 2 (L2) protocol 508, a user datagram protocol/IP (UDP/IP) 522 and general packet radio service (GPRS) tunneling protocol—user plane (GTP-U) 524 as shown in FIG. 1.

FIG. 5 further illustrates an example radio protocol architecture 503 for the user plane in LTE to support direct radio communication between a UE 502 and UE 532 (e.g., data path 105 in FIG. 1). In an aspect, each layer (e.g., 520, 518, 514, 512, 510, and 506) associated with UE 502 may communicate directly with the corresponding layers associated with UE 532 and may be the same layers used to communicate between a UE and eNB in network mode as described for radio protocol architecture 501.

In the control plane, the radio protocol architecture for the UE and eNB is substantially the same for the physical layer 506 and the L2 layer with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB 504 and the UE 502.

Figure 6:
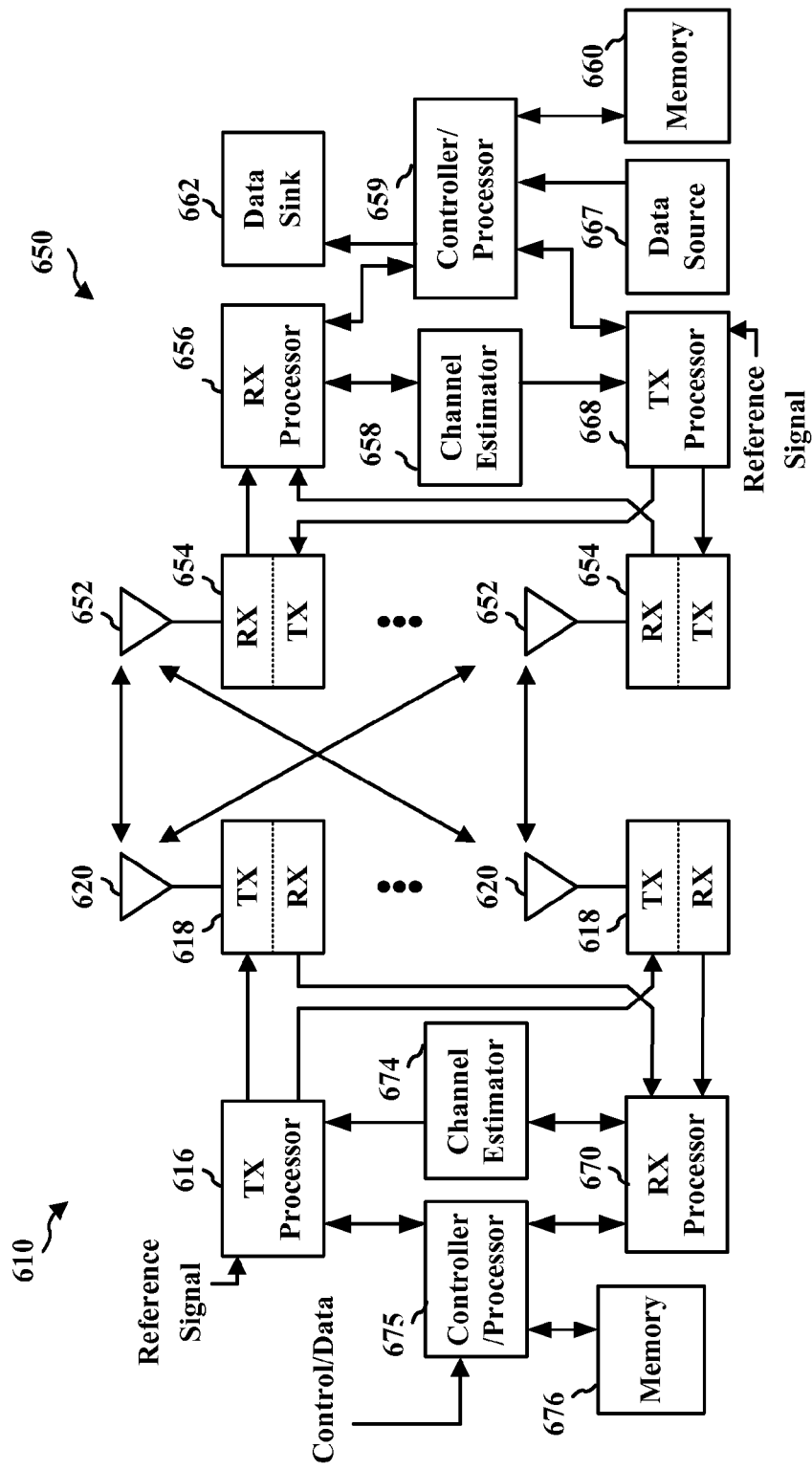
FIG. 6 is a diagram illustrating an example of an evolved Node B and user equipment in an access network.

FIG. 6 is a block diagram of a PLMN entity (e.g., eNB, MME, PDG, CSCF, etc.) 610 in direct or indirect communication with a UE 650. UE 650 may be UE 102 or 103 in FIG. 1 and PLMN entity 610 may be any of the entities shown as part of V-PLMN 104, H-PLMN 130 and H-PLMN 132 in FIG. 1. In the downlink (DL) direction, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the PLMN entity 610. These soft decisions may be based on channel estimates computed by the channel estimator 658. The soft decisions are then decoded and deinterleaved to recover the data and control signals that were originally transmitted by the PLMN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL direction, a data source 667 in UE 650 is used to provide upper layer packets to the controller/processor 659. The data source 667 represents all protocol layers above the L2 layer. Similar to the functionality described in connection with the DL transmission by the PLMN entity 610, the controller/processor 659 implements the L2 layer for the user plane and the control plane by providing header compression, ciphering, packet segmentation and reordering, and multiplexing between logical and transport channels based on radio resource allocations by the PLMN entity 610. The controller/processor 659 is also responsible for HARQ operations, retransmission of lost packets, and signaling to the PLMN entity 610.

Channel estimates derived by a channel estimator 658 from a reference signal or feedback transmitted by the PLMN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the PLMN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
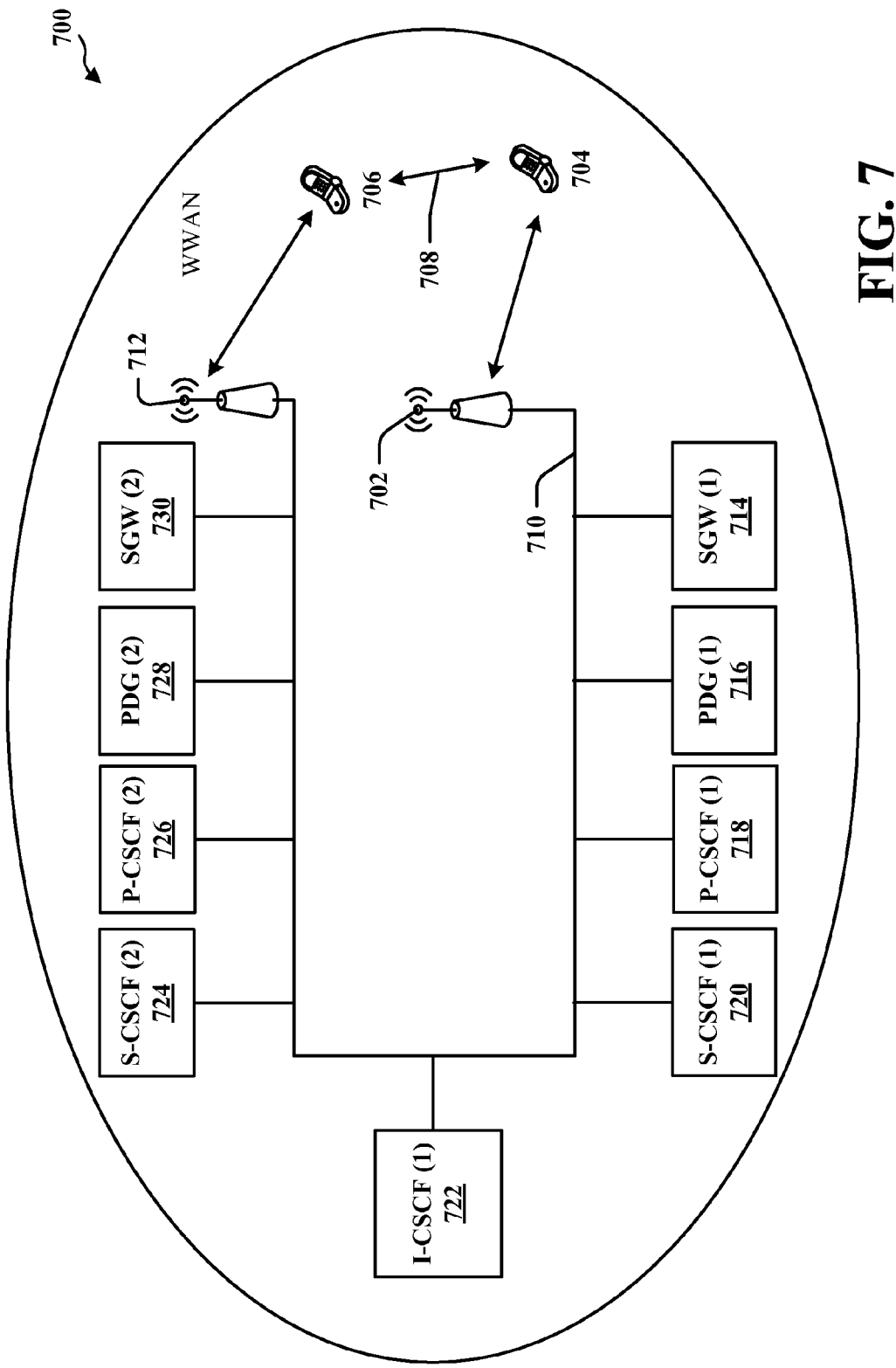
FIG. 7 is a diagram illustrating an access network that supports device-to-device communications.

FIG. 7 is a diagram of an access network 700 that supports D2D communications and IMS services. Access network 700 may comprise or be part of one PLMN or several PLMNs and may correspond to the combination of V-PLMN 104, H-PLMN 130 and H-PLMN 132 in FIG. 1. Access network 700 may provide wireless services to a plurality of wireless devices 704, 706 that are operable to support D2D communications over a D2D communication link 708. Wireless devices 704 and 706 may correspond to UEs 102 and 103 in FIG. 1. In an aspect, D2D communications may be point to point or multipoint (e.g., broadcast from one device to other devices). Access network 700 may include one or more eNBs 702, 712 (e.g., eNBs 106 and 108 in FIG. 1) that provide support for wireless devices 704, 706. Access network 700 may also include serving gateways (SGW) 714, 730 (e.g., serving gateways 116, 117 in FIG. 1), PDGs 716, 728 (e.g., PDN Gateways 118, 119 in FIG. 1), P-CSCFs 718, 726 (e.g., P-CSCFs 124, 125 in FIG. 1), S-CSCFs 720, 724 (e.g., S-CSCFs 126, 136 in FIG. 1), I-CSCFs 722 (e.g., I-CSCF 128 in FIG. 1), etc.

In an operational aspect, UEs 704 and 706 may establish an IMS session through the network. The IMS session may include data (e.g., media content) and signaling (e.g., SIP signaling). Use of D2D communications over the D2D communication link 708 (e.g., D2D link 105 in FIG. 1) may reduce network loading. Wireless device locations as well as serving cell IDs may be used to determine when a D2D communication link 708 may be established. Wireless devices 704, 706 that are within a threshold distance of each other may use D2D communications. Further, when the wireless devices 704, 706 separate beyond a threshold distance of each other, then a network based communications path 710 (e.g., corresponding to data traffic path 109 and/or signaling network path 107 in FIG. 1) may be used. In an aspect, the thresholds for switching to D2D communications and switching from D2D communications may be different threshold distances. For IMS communication, the media paths (e.g., data traffic) may be communicated over the D2D communication link 708 while the signaling path 710 may remain supported via the network. In an aspect, wireless device 704 and wireless device 706 may be supported by different network entities and have different H-PLMNs. In such an aspect, SIP signaling (e.g., signaling path 710) may be communicated from wireless device 704 to wireless device 706 via eNB(1) 702, SGW(1) 714, PDG(1) 716, P-CSCF(1) 718, S-CSCF(1) 720, I-CSCF(1) 722, S-CSCF(2) 724, P-CSCF(2) 726, PDG(2) 728, SGW(2) 730, and eNB(2) 712. In another aspect, wireless devices 704 and 706 may be supported by the same H-PLMN. In such an aspect, wireless devices' 704 and 706 S-CSCF(1) 720 and S-CSCF(2) 724 may be the same S-CSCF. In another aspect, the wireless devices 704, 706 may be located in a common V-PLMN. In such an aspect, P-CSCF(1) 718 and P-CSCF(2) 726 may be the same P-CSCF or may be different P-CSCFs. Further discussion of a support on IMS session data traffic using a D2D communication link 708 while maintaining signaling (e.g., SIP signaling) support through a network path 710 is provided with reference to FIGS. 8-11.

Figure 8:
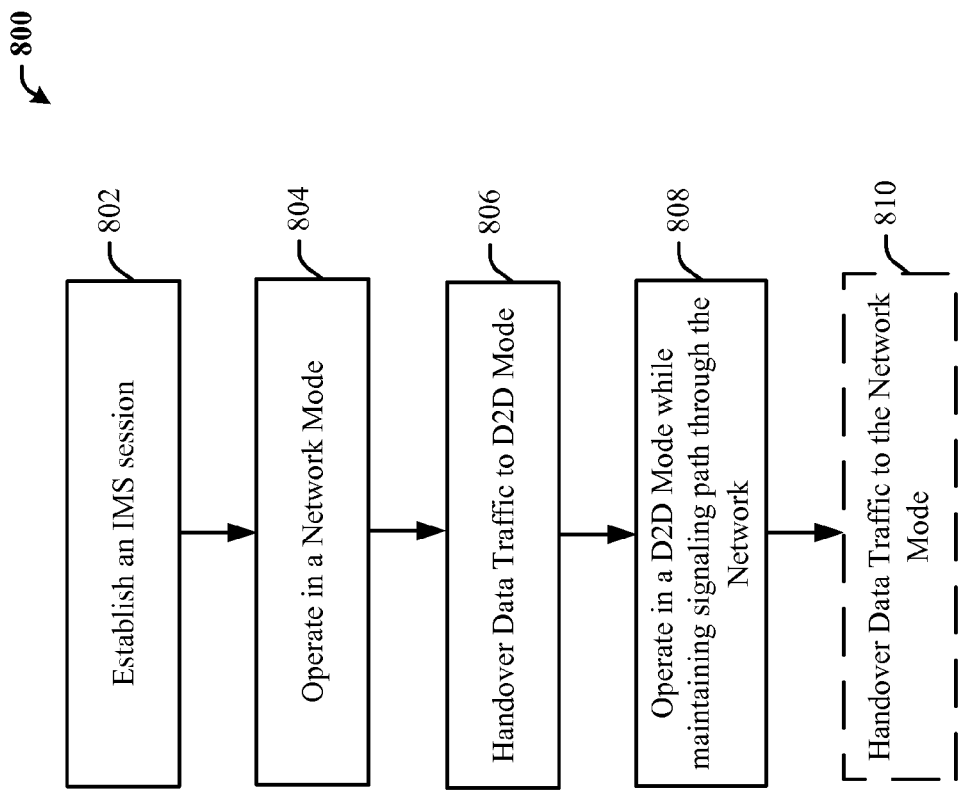
FIG. 8 is a flow chart of a first method of wireless communication.
Figure 11:
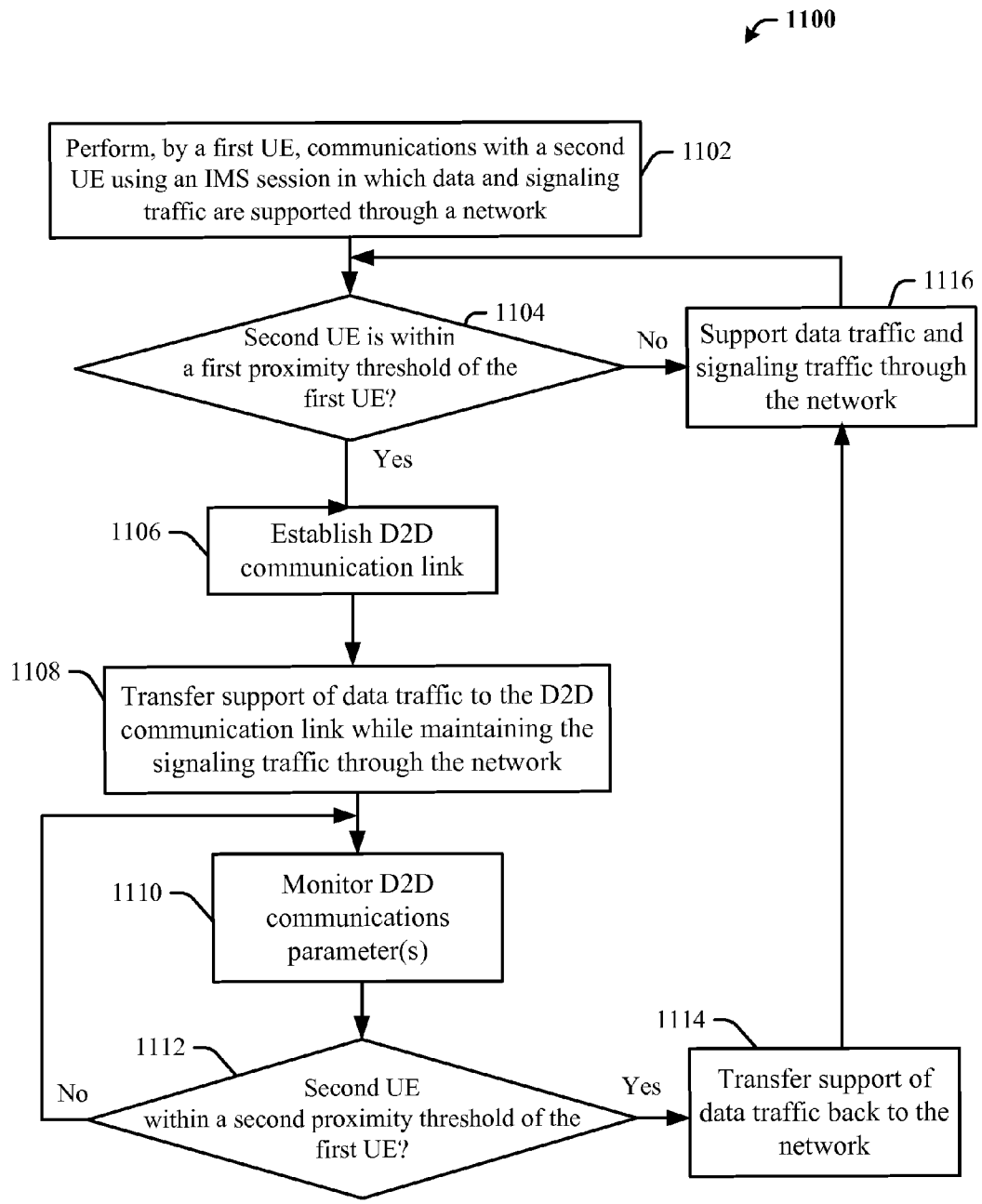
FIG. 11 is a flow chart of a second method of wireless communication.

FIGS. 8 and 11 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 is a flow chart 800 of a first method of wireless communication. The method may be performed by a UE, an eNodeB, an MME, etc., or any combination thereof.

At block 802, an IMS session may be established between two or more UEs served by the same V-PLMN (e.g., V-PLMN 104 in FIG. 1). In an aspect, the data traffic may be supported through an LTE based network (e.g., eNBs, SWGs, PDGS). As an example, the data traffic may be supported according to the data traffic flow 109 described in association with FIG. 1 and signaling traffic may be supported according to the signaling traffic flow 107 described in association with FIG. 1 and the network based communications path 710 described in association with FIG. 7. Further, each P-CSCF supporting the signaling traffic for the IMS session (e.g., P-CSCFs 718, 726 in FIG. 7 and P-CSCFs 124, 125 in FIG. 1) may obtain serving cell information for its local UEs (e.g., UEs 102 and 103 in FIG. 1 and UEs 704 and 706 in FIG. 7). As such, each P-CSCF may minimally have serving cell information for its local UE following IMS call establishment. In an aspect, the P-CSCFs may exchange serving cell IDs (e.g., using the SIP INVITE and "SIP 200 OK" used to establish the IMS session). In another aspect, where serving cell IDs are not exchanged, P-CSCFs can provide a central entity such as (but not limited to) a policy and charging rule function (PCRF) with the serving cell ID for each UE and unique common information for the IMS call, such as but not limited to a SIP Call-ID header, public SIP URIs of the UEs, etc. In such an aspect, the PCRF may associate serving cell IDs via the common information and determine whether the UEs are close together due to using the same serving cell or using different serving cells that are close together. In another aspect, serving MMEs may also provide the PCRF with the capability of each UE to support D2D communications.

At block 804, the UEs may operate in a network mode in which all data and signaling for the IMS session is carried over the network (e.g., V-PLMN 104 and H-PLMNs 130 and 132 in FIG. 1). In an aspect, the UEs may periodically broadcast (e.g., a pilot signal at a defined transmission power) and/or listen for broadcasts from other UEs. In an aspect, each UE may periodically broadcasts to the other UEs in a manner synchronized with network (e.g., eNB) time. Further, during network mode operations, each UE may communicate measurements obtained from listening to other UE broadcasts to its serving eNB. In an aspect, the measurement may include signal strength, signal quality, etc. In another aspect, the UEs may determine relative distances from each other and report the UE distance information to their serving eNBs. Thereafter, the eNBs may provide the UEs information on D2D LTE broadcasts from each UE. In another aspect, the PCRF may invoke D2D broadcast/listening in each UE based at least in part on serving cell IDs and mutual UE capability to support D2D communications. In such an aspect, the invocation may be included in the messages used to activate the EPS bearer(s) for data path communications. Such messages may be sent to the UEs via the eNB, MME, SWG, PDG, and PCRF. In another aspect, the PCRF may provide each MME a common session ID associated with the bearer(s) for the IMS session for the UE, and the identity of any other MMEs. Further, in such an aspect, the eNB may include the invocation information with communications to the UEs.

At block 806, a portion of the IMS session may be transferred (e.g., handed over) from Network mode to D2D mode. In an aspect, the network (e.g., a serving eNB) may determine that UEs can operate in D2D mode based on UE-UE measurements such as but not limited to UE-UE distance and the strength and quality of a signal broadcast by one UE as received by another UE. In another aspect, the portion of the IMS session transferred to D2D mode support may be data traffic. Additionally, LTE bearers for the data traffic may be deactivated and session description protocol (SDP) information associated with the network data traffic may be updated using SIP signaling to indicate that the data traffic is no longer carried over the network. Handing data traffic over to D2D mode support is discussed further with reference to the call flow diagram in FIG. 9.

At block 808, the UEs may operate in the D2D mode. In an aspect, data traffic associated with the IMS session may be supported over the D2D communication link such as the D2D communications link 105 described in association with FIG. 1 while signaling traffic may continue to be supported in a network mode such as by continuing to use the signaling traffic link 107 described in FIG. 1. In an aspect, UEs may monitor signal strength and quality from the other UE, signal strength and quality from nearby eNBs, UE-UE distance, etc. In an aspect, a UE may be designated as a controlling UE and other UEs may communicate their signal measurements to the controlling UE. In another aspect, each UE may have control capability and with each UE then sending its measurements to the other UEs. In another aspect, UEs may negotiate modification of the bearers while in D2D mode (e.g., addition or removal of bearers without interaction with any network entities).

In an optional aspect, at block 810, the UEs may transfer support of the data traffic back to the network. This may occur when one or more UEs determine based on increased distance between UEs and/or based on reduced strength and quality of signals received from other UEs that D2D communication will no longer provide adequate support. In such an aspect, a UE may send a handover request to its serving eNB. Returning data traffic to network mode support is discussed further with reference to the call flow diagram in FIG. 10.

While the UEs are operating in D2D mode in block 808, additional parties (e.g., UEs or devices attached to fixed networks) may be added to the IMS session (e.g., at the request of one of the UEs) in which case it may be necessary to add support for additional data bearers and additional data flow between each UE and each additional party. Such additional data bearers and additional data flow may need to be supported by the network unless an additional party is close to both UEs and supports D2D mode in which case data transfer may occur between both UEs and the additional party using D2D mode. Similarly, additional parties that are already part of an IMS session may leave the IMS session while the two UEs are in D2D mode in which case any network data path between each UE and the additional party may be removed. Prior to entering D2D mode, two UEs that have an IMS session through the network may have additional parties attached to the IMS session in which case when the two UEs are able to enter D2D mode, network connections may remain for each UE to transfer data to the additional parties. In general, two or more UEs may use D2D mode to more efficiently transfer data communication between one another while using network mode to (i) transfer signaling information between one another and (ii) transfer data communication and signaling communication between each UE and one or or more other parties attached to the IMS session that either do not support D2D mode or are too far away from both UEs to enable use of D2D mode. FIGS. 1, 7 and 8 may thus exemplify a special case where there may be no additional parties except for two UEs on an IMS session. In the more general case where there are more than two parties on an IMS or SIP session, some of the data communication between pairs of parties may employ D2D mode whereas other data communication and all signaling communication between two or more parties may employ network mode and may be routed through one or more networks.

Figure 9:
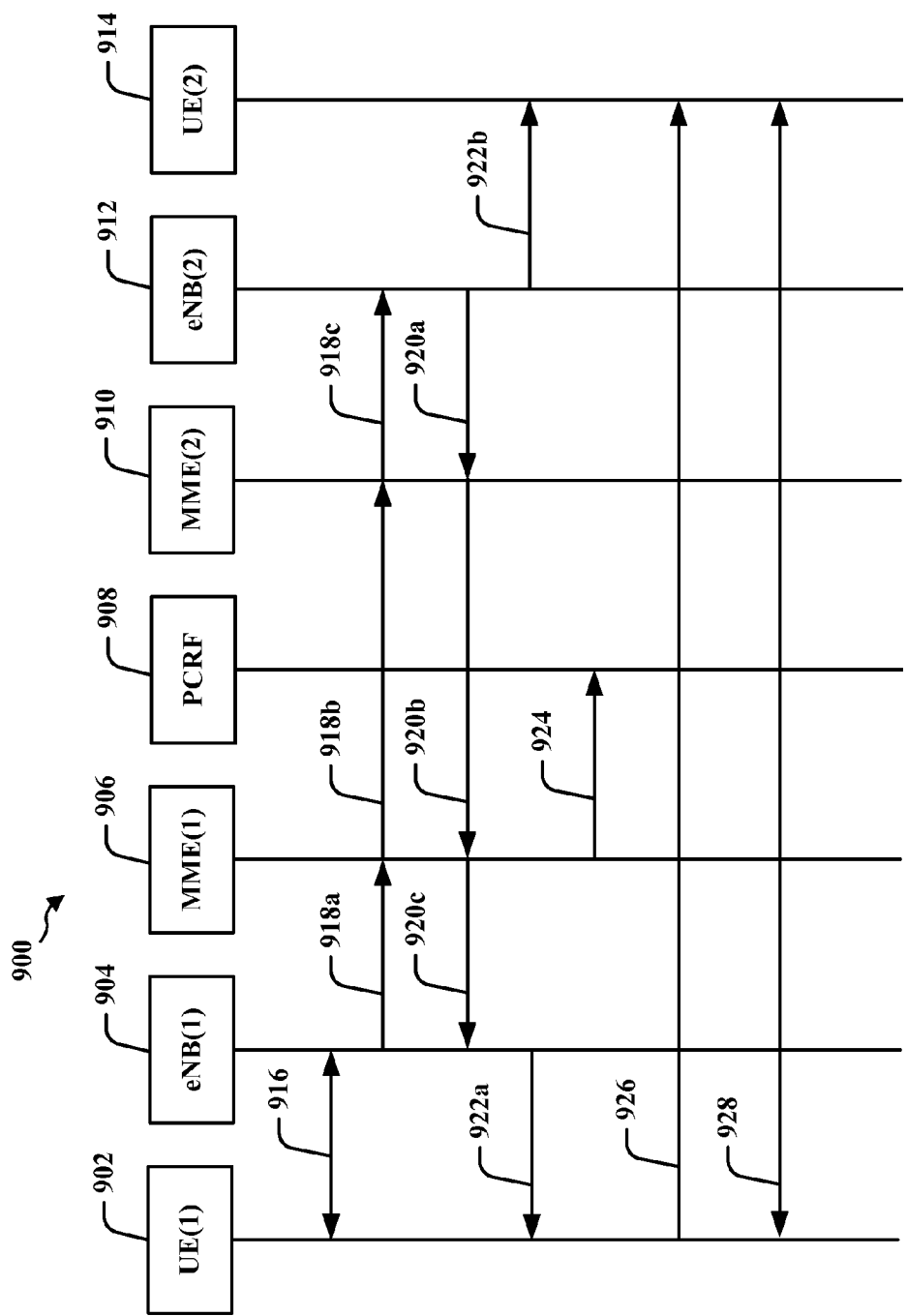
FIG. 9 is a call flow diagram illustrating a communications among entities within an access network.

FIG. 9 is a call flow diagram illustrating a communications among entities within an access network 900. FIG. 9 may correspond to block 806 in FIG. 8. In an aspect, access network 900 may include multiple UEs (e.g., UE(1) 902, UE(2) 914), one or more eNBs (e.g., eNB(1) 904, eNB(2) 912), one or more MMEs (e.g., MME(1) 906, MME(2) 910), and a PCRF 908. In an aspect, access network 900 may allow support of at least a portion of an IMS session (e.g., data traffic) to be transferred from a network mode to a D2D mode. UEs 902 and 914 may correspond to UEs 102 and 103 in FIG. 1 and to UEs 704 and 706 in FIG. 7. eNBs 904 and 912 may correspond to eNBs 106 and 108 in FIG. 1 and to eNBs 702 and 712 in FIG. 7. MMEs 906 and 910 may correspond to MMEs 112 and 114 in FIG. 1. Access neteweork 900 may further contain other entities not shown in FIG. 9 such as PDGs, SWGs, P-CSCFs, S-CSCFs that may correspond to PDGs, SWGs, P-CSCFs and S-CSCFs in FIGS. 1 and 7.

At act 916, a decision to initiate the D2D mode may be made. In an aspect, the decision may be made by a UE, eNB, MME, etc, based at least in part on one of a UE-UE distance between UE(1) 902 and UE(2) 914, the strength of a signal transmitted by UE 902 or UE 914 and received by UE 914 or 902, respectively, and the quality of a signal transmitted by UE 902 or UE 914 and received by UE 914 or 902, respectively. For example, a serving eNB (e.g., eNB(1) 904) may determine that UEs (e.g., UE(1) 902, UE(2) 914) can operate in D2D mode based on received UE D2D measurements.

The serving eNBs (e.g., eNB(1) 904, eNB(2) 912) and MMEs (e.g., MME(1) 906, MME(2) 910) may agree to handover and switch the data path of a IMS session to D2D mode support. In an aspect, the agreement may be obtained through use of D2D mode request messages at acts 918a, 918b, and 918c, and D2D mode accept messages at acts 920a, 920b, and 920c. In an aspect, the communications among the eNBs and MMEs may include information such as but not limited to, a session identifier, D2D RF channel information for each UE, etc. The request messages in acts 918a, 918b, 918c may convey the D2D RF channel information applicable to UE 902 (e.g., comprising channel information which may have been assigned by eNB 904) whereas the accept messages in acts 920a, 920b, 920c may convey the D2D RF channel information applicable to UE 914 (e.g., comprising channel information which may have been assigned by eNB 912). This may enable eNBs (e.g., eNB(1) 904, eNB(2) 912) to agree on D2D RF characteristics which may then be sent to both UEs (e.g., UE(1) 902, UE(2) 914) in acts 922a and 922b.

At act 924, at least one of the MMEs (e.g., MME 906) may indicate to PCRF 908 that the data traffic from the IMS session between UEs 902 and 914 is supported through the D2D mode. In such an aspect, the MME may provide a session identifier associated with the IMS session. In another aspect, if an MME for one of the UEs 902 and 914 changes to a new MME (e.g., due to handover of the UE to a new eNB), the MME for the other UE can send a request to the PCRF together with the session ID and the PCRF can locate the new MME. In another aspect, MMEs may communicate directly with each other to maintained updated information on change of MMEs. Such direct MME updating or such use of a PRCF to locate a new MME may be needed to enable the MME to MME communication in acts 918b and 920b to occur in a reliable manner.

At act 926, UE(1) 902 may send a SIP re-invite to UE(2) 914 via the network signaling path (not shown in FIG. 9 but exemplified by the signaling communications path 107 in FIG. 1) to remove any network media paths (e.g., network supported data traffic). Thereafter, at act 928, UE(1) 902 and UE(2) 914 may cease to use network bearers and may switch their data traffic to D2D mode. In an aspect, the network (e.g., policy and charging control (PCC)) may leave, modify or deactivate the data traffic bearers to UE(1) 902 and UE(2) 914 in a PDG(1) and PDG(2), an SWG(1) and an SWG(2), and eNB(1) 904 and eNB(2) 912. In this case, PDG(1), PDG(2), SWG(1), SWG(2) may correspond to PDG 118, PDG 119, SWG 116, SWG 117, respectively, in FIG. 1 and/or to PDG 716, PDG 728, SWG 714, SWG 730, respectively, in FIG. 7. Additionally or as an alternative, MME(1) 906 and MME(2) 908 may receive instructions from the PCRF 908 (e.g., when the IMS session between UEs 902 and 914 is first established) on how to deal with network bearers while the UEs are in D2D mode.

Figure 10:
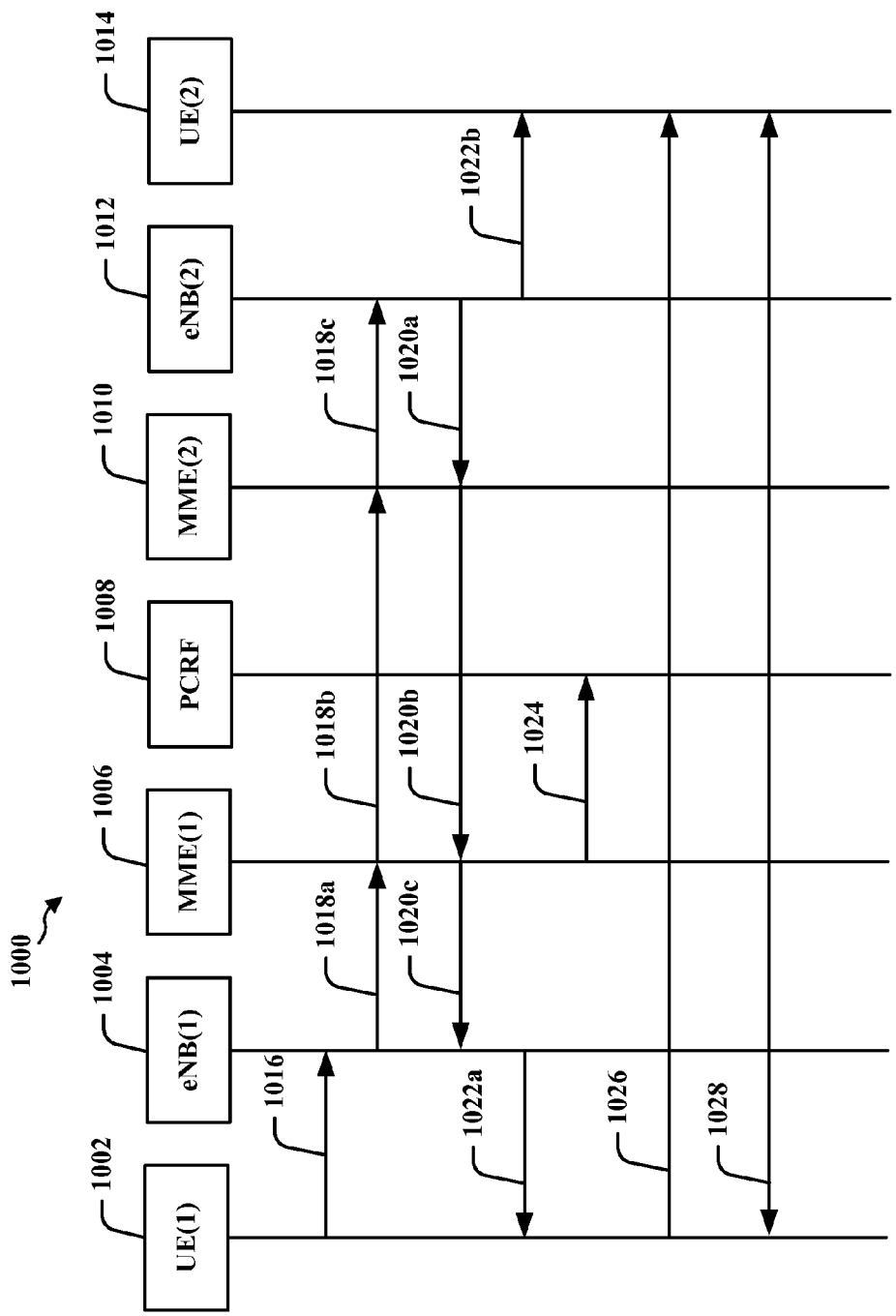
FIG. 10 is another call flow diagram illustrating a communications among entities within an access network.

FIG. 10 is another call flow diagram illustrating a communications among entities within an access network 1000. FIG. 10 may correspond to block 810 in FIG. 8. In an aspect, access network 1000 may include multiple UEs (e.g., UE(1) 1002, UE(2) 1014), one or more eNBs (e.g., eNB(1) 1004, eNB(2) 1012), one or more MMEs (e.g., MME(1) 1006, MME(2) 1010), and a PCRF 1008. In an aspect, access network 1000 may allow support of at least a portion of an IMS session (e.g., data traffic) to be transferred from a D2D mode to a network mode. UEs 1002 and 1014 may correspond to UEs 102 and 103 in FIG. 1, to UEs 704 and 706 in FIG. 7 and to UEs 902 and 914 in FIG. 9. eNBs 1004 and 1012 may correspond to eNBs 106 and 108 in FIG. 1, to eNBs 702 and 712 in FIG. 7 and to eNBs 904 and 912 in FIG. 9. MMEs 1006 and 1010 may correspond to MMEs 112 and 114 in FIG. 1 and to MMEs 906 and 910 in FIG. 9. Access network 1000 may further contain other entities not shown in FIG. 10 such as PDGs, SWGs, P-CSCFs, S-CSCFs that may correspond to PDGs, SWGs, P-CSCFs and S-CSCFs in FIGS. 1 and 7.

At act 1016, UE(1) 1002 may trigger a service request to initiate transfer from a D2D mode to a network mode. In an aspect, UE(1) 1002 may determine from UE signal measurements to handover back to network mode. For example, UE 1002 may determine that the distance from UE 1002 to UE 1014 has increased sufficiently, or the signal strength and/or signal quality received from UE 1014 has decreased sufficiently, to make continued D2D communication between UEs 1002 and 1014 difficult or impossible. As an example, while D2D communication could still be possible, the increase in UE battery usage to send stronger signals for D2D mode may not be efficient. In such an aspect, UE(1) 1002 may send a request to eNB(1) 1004 (e.g., after invoking a UE triggered service request if in LTE ECM_IDLE state). In an aspect, the request may include the eNB and UE-UE measurements made by UE 1002 and may possibly include the measurements made by UE 1014 if these were previously transferred to UE 1002 by UE 1014 (e.g., via D2D mode). In another aspect, the request may include information on the data bearers to be set up in the network. In such an aspect, the network based data bearers needed by UEs 1002 and 1014 may have changed while the UEs were in D2D mode and may thus be different to the network data bearers provided to UEs 1002 and 1014 prior to the UEs entering D2D mode.

The serving eNBs (e.g., eNB(1) 1004, eNB(2) 1012), (e.g., MME(1) 1006, MME(2) 1010), and PCRF 1008 may activate new EPS bearers and switch the data path back to the network. In an aspect, the new EPS bearers may be obtained through use of network mode request messages at acts 1018a, 1018b, and 1018c and network mode accept messages at acts 1020a, 1020b, and 1020c. In an aspect, the network mode request message may include a session identifier. The request messages in acts 1018a, 1018b, 1018c may convey information on the data bearers needed including, for example, bandwidth and quality of service information. In another aspect, MME(2) 1010 may page UE(2) 1014 (not shown in FIG. 10) after receiving the network mode request message in act 1018b if UE 1014 is currently in idle state (e.g., LTE ECM_IDLE state) in order to establish a signaling link with UE 1014 and assign serving eNB(2) 1012. As a result of receiving paging, UE(2) 1014 may invoke a UE triggered service request (not shown in FIG. 10) to establish the signaling link and assign eNB(2) 1012. MME(2) 1010 may then send the network mode service request to the assigned eNB(2) 1012 in act 1018c.

At acts 1022a and 1022b, the eNBs 1004 and 1012 may send commands to UEs 1002 and 1014, respectively, to tell both UEs to enter the network mode. At act 1024, at least one of the MMEs (e.g., MME 1006) may indicate to PCRF 1008 that the data traffic from the IMS session is now supported through the network mode.

At act 1026, UE(1) 1002 may send a SIP re-invite to UE(2) 1014 via the IMS signaling path already set up in the network with information on the media (e.g., data traffic) to be switched back to the network and associated UE session description to enable media paths to be established between the UEs through the network. In such an aspect, use of the SIP re-invite may allow each P-CSCF (e.g., P-CSCFs 124 and 125 in FIG. 1 or P-CSCFs 718 and 726 in FIG. 7) to instigate bearer activation or modification via PCC and send to the other P-CSCF the media IP addresses used in the PDG associated with the sending P-CSCF. Thereafter, at act 1028, UE(1) 1002 and UE(2) 1014 may cease to use D2D mode and may switch their data communication to network mode—e.g., using the data communication path 109 described in FIG. 1.

FIG. 11 is a flow chart 1100 of a second method of wireless communication. The method may be performed by a UE.

At block 1102, a first UE may perform communications with a second UE using an IMS session in which data (e.g., voice, video or text media) traffic and signaling (e.g., SIP) traffic are both supported by a network. As used herein, the network may include architectural elements that support LTE, IMS, D2D, etc. In an aspect, the data traffic path may be LTE supported (e.g., via eNBs, SWG, PDGs) and signaling traffic may be IMS supported (e.g., via eNBs, SWG, P-CSCFs, S-CSCFs).

At block 1104, a determination is made as to whether the first UE and second UE are within a sufficiently close proximity to enable D2D communications. In an aspect, following IMS session establishment, each proxy call session control function (P-CSCF) may be aware of local UE serving cell information. Further, P-CSCFs may exchange serving cell IDs (e.g., using SIP INVITE and 200 OK messages) with support from their respective home networks. When serving cell IDs are not exchanged, P-CSCFs may provide a policy charging and rules function (PCRF) with the serving cell ID for each UE and information associated with the call, such as but not limited to the SIP Call-ID header, the public SIP URIs of both UEs, etc. In such an aspect, the PCRF may then associate the two serving cell IDs via the information associated with the call and determine whether the UEs are close together. When serving cell IDs are exchanged, either P-CSCF can perform a comparison to determine at least a relative distance between the UEs (e.g., PCC is not required). In another aspect, the serving MMEs can also provide the PCRF with the capability of each UE to support D2D which may be obtained when each UE attaches to the LTE network. While being supported by the network, a PCRF can invoke D2D broadcast/listening in each UE based on the serving cell IDs and mutual UE capability to support D2D. In an aspect, the invocation may be included in the messages used to activate the EPS bearer(s) for the data path—these messages are sent from the PCRF to the PDG, the PDG to the SWG, the SWG to the MME and the MME to the eNB for each UE. The PCRF can also provide to each serving MME a common session ID associated with the bearer(s) for the IMS session for the UE and the identity of the other MME. In an aspect, a RRC reconfiguration message may be sent from the eNB to UE including the invocation and information on D2D LTE broadcast from each UE. Further, each UE then may periodically broadcast to the other in a manner synchronized with network (e.g., eNB) time. Each UE may listen for the other's broadcast and may measure signal strength and quality and a UE-UE distance may be measured. Thereafter, the UEs may report measurements to serving eNBs. A serving eNB may then determine that UEs can operate in D2D mode based on received UE D2D measurements. In such an aspect, UEs may communicate in D2D mode when the UEs are within a first threshold of each other.

If at block 1104, the first and second UEs are determined by the UEs or by a serving eNB to be within a first threshold of each other, then at block 1106, the UEs may establish a D2D communication link.

At block 1108, the UEs may transfer data traffic associated with the IMS session to the D2D communication link while maintaining the signaling traffic support through the network. In an aspect, to switch the data path the serving eNB(s) may agree on the D2D RF characteristics and send this to both UEs. Further, network bearers can then be deactivated by the MME(s).

At block 1110, data traffic may be communicated between the UEs using D2D mode and various attributes associated with the D2D communication link may be monitored by the UEs. Each UE may monitor and periodically measure values, such as but not limited to, signal strength and quality from the other UE, signal strength and quality from nearby eNBs, UE-UE distance, etc. In an aspect, a UE may be designated as the controlling UE with the other UE transferring its signal measurements to it. Additionally or as an alternative, both UEs may have control capability with each UE then sending its measurements to the other UE. In another aspect, the UEs may negotiate modification of the bearers while in D2D mode (e.g., addition or removal of bearers) without providing this information to the network.

At block 1112, a determination may be made to determine whether the first UE and second UE are within a second threshold of each other. In an aspect, at least the UE-UE distance may be used to compare with a second threshold. The second threshold may be a distance, signal strength, signal quality etc., outside which and/or below which D2D communications may not be supported.

If at block 1112 the determination is that the first and second UEs are within the second threshold of each other, then the process may return to block 1110 to continue monitoring the D2D communication link.

By contrast, if at block 1112 the determination is that the first and second UEs are not within the second threshold of each other, then the data traffic may be transferred back to being supported by the network at block 1114. In an aspect, the controlling UE (or either controlling UE) may determine from UE signal measurements that handover back to network mode may be preferred. The UE may then send a request to its serving eNB (e.g., after invoking a UE triggered service request if in ECM_IDLE state). In an aspect, the request may include the latest eNB and UE-UE measurements to enable the serving eNB to verify that network mode is needed and can be supported. In another aspect, the request may include information on the bearers to be set up (which may have changed while the UEs were in D2D mode). The serving eNBs, MMEs and PCRF may then activate new EPS bearers and switch the data path back to the network.

Returning to block 1104, when the UEs are determined to either not be within a sufficiently close proximity at block 1104 or are determined to have moved out of the close proximity at block 1112, then at block 1116, both the data traffic and signaling traffic may be supported through the network. While in block 1116, block 1104 may be invoked again at some later time if the current serving cells for the first and second UEs imply (e.g., to the MMEs or PCRF) that the conditions for entering or reentering D2D mode may have occurred.

Figure 12:
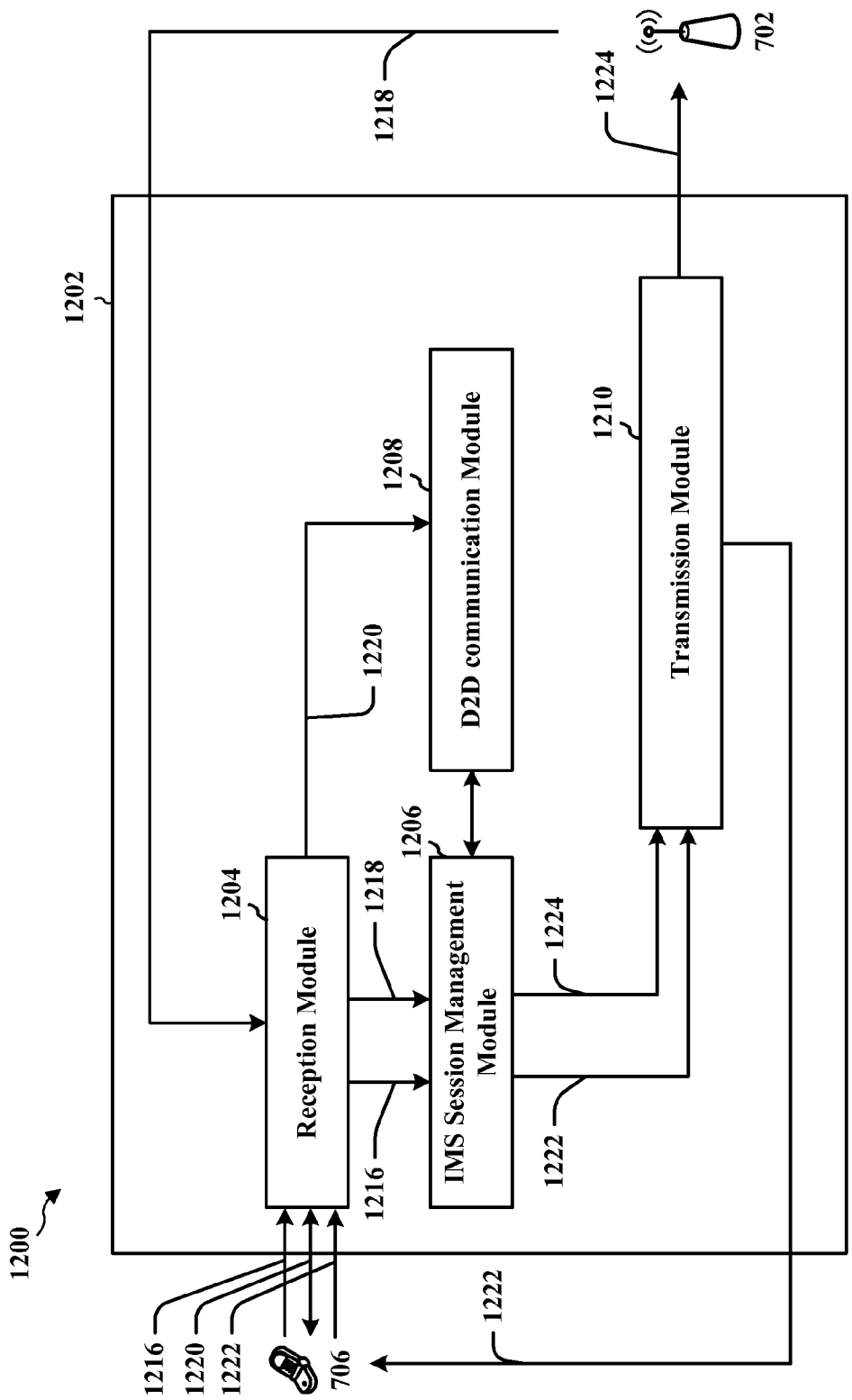
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE.

The apparatus 1202 includes a reception module 1204 that may receive measurements 1216 from a second UE 706 with which the first UE may establish a D2D link. Reception module 1204 may further receive signaling and data from eNB 702 associated with an IMS session 1218. Further, reception module 1204 may receive information indicating that the apparatus 1202 and UE 706 have established a D2D communication link 1220. In an aspect, apparatus 1202 may include D2D communication module 1208 which may monitor one or more measurements associated with the D2D communication link 1220. The apparatus 1202 further includes a IMS session management module 1206 that may process the received UE measurements 1216 from the second UE 706, and the IMS session signaling and data from eNB 702 to determine whether the data traffic 1222 may be supported using the D2D communication link 1220. Where the data traffic 1222 may be supported using the D2D communication link 1220, the IMS session may prepare data traffic 1222 for communication over the D2D communication link 1220 while maintaining the signaling traffic 1224 through the network. Apparatus 1202 may further include transmission module 1210 that may transmit information data traffic 1222 associated with an IMS session directly to UE 706 using the D2D communication link 1220 and may transmit signaling traffic 1224 associated with the IMS session through the network (e.g., eNB 702).

The apparatus may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
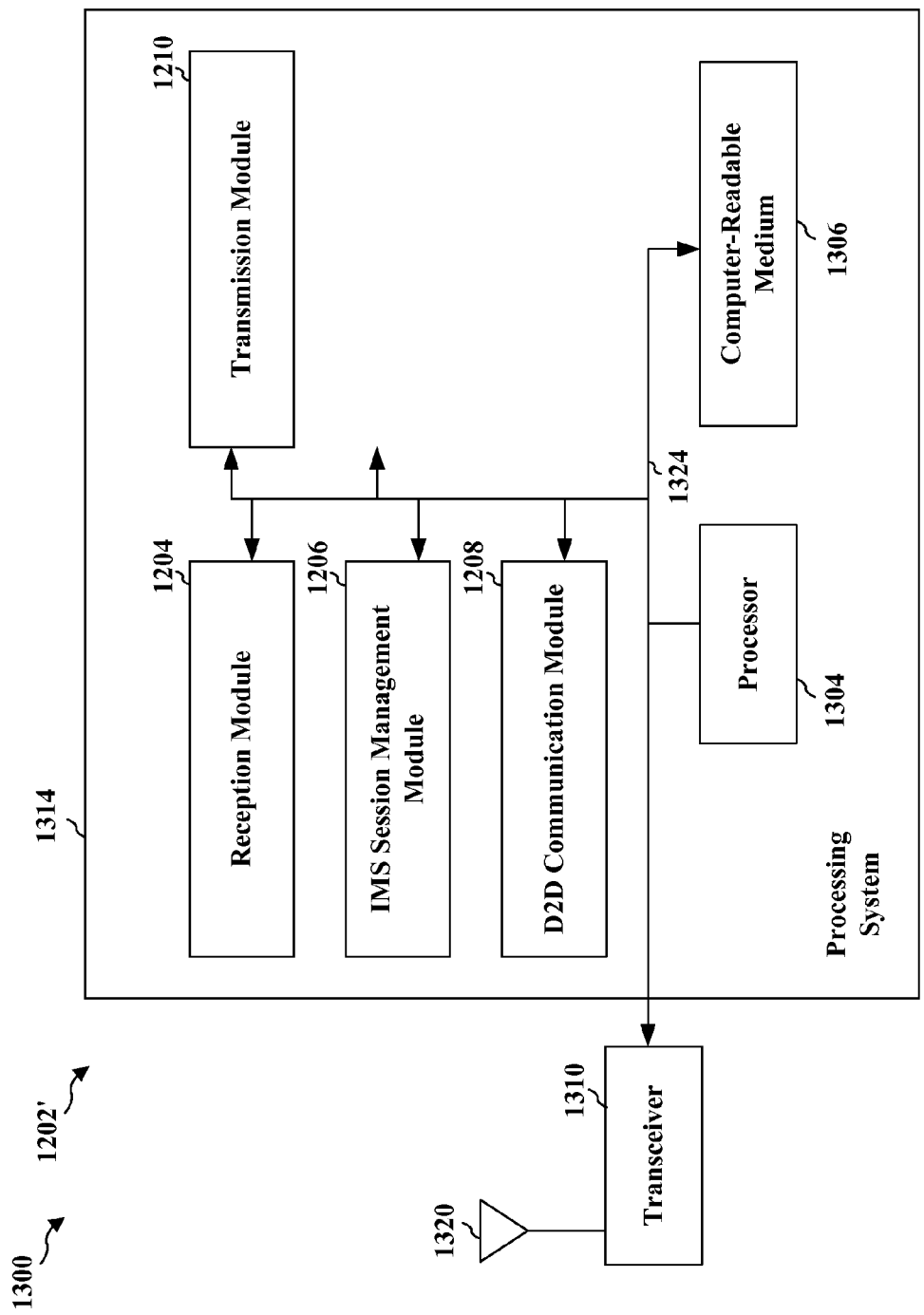
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for performing, by a first UE, communications with a second UE using an IMS session in which data traffic and signaling traffic are supported through a network, means for determining that the second UE is within a first proximity threshold of the first UE, means for establishing a D2D communication link with the second UE, and means for transferring support of the data traffic to the D2D communication link while maintaining the support of the signaling traffic through the network. In an aspect, the first proximity threshold may be a distance between the first and second UEs within which device-to-device (D2D) communications are supported. In an aspect, the apparatus 1202/1202' means for determining may further be configured to determine that the second UE is farther than a second proximity threshold from the first UE. In an aspect, the second proximity threshold may be a distance between the first and second UEs beyond which D2D communications are not supported. In such an aspect, the apparatus 1202/1202' means for transferring may be configured to the data traffic to be supported through the network. In such an aspect, the apparatus 1202/1202' means for establishing may be further configured to receive a message from the network prompting the first and second UEs to establish the D2D communication link. In an aspect, the apparatus 1202/1202' means for determining may be configured to determine that the first and second UEs use a common serving cell, determine that the first and second UEs use nearby serving, etc. In an aspect, the apparatus 1202/1202' means for determining may be configured to measure one of more D2D communication parameters, and determine that at least one of the one or more D2D communication parameters is below a D2D communications threshold.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   performing, by a first user equipment (UE), communications with a second UE using an internet protocol (IP) multimedia subservice (IMS) session in which data traffic and signaling traffic are supported through a network;
   determining that the second UE is within a first proximity threshold of the first UE;
   establishing a device-to-device (D2D) communication link with the second UE and sending a message from the first UE to the second UE through a signaling traffic communication path of the network to remove a network supported data path between the first UE and the second UE; and
   transferring, by the first UE, support of the data traffic to the D2D communication link while continuing to maintain the support of the signaling traffic of the IMS session through the network after the establishing of the D2D communication link with the second UE and the transferring of the support of the data traffic to the D2D communication link.

2. The method of claim 1, further comprising:
   determining that the second UE is farther than a second proximity threshold from the first UE; and
   returning the data traffic to be supported through the network.

3. The method of claim 1, wherein the first proximity threshold between the first and second UEs comprises one of a distance between the first and second UEs, a signal strength of the second UE measured by the first UE, or a signal quality of the second UE measured by the first UE.

4. The method of claim 2, wherein the second proximity threshold between the first and second UEs comprises one of a distance between the first and second UEs, a signal strength of the second UE measured by the first UE, or a signal quality of the second UE measured by the first UE.

5. The method of claim 1, wherein the signaling traffic includes Session Initiation Protocol (SIP) signaling.

6. The method of claim 1, wherein establishing the D2D communication link further comprises:
   receiving a message from the network prompting the first and second UEs to establish the D2D communication link.

7. The method of claim 1, wherein determining that the second UE is within the first proximity threshold of the first UE is based in part on at least one of:
   determining that the first and second UEs use a common serving cell; or
   determining that the first and second UEs use nearby serving cells.

8. The method of claim 2, wherein determining that the second UE is farther than the second proximity threshold from the first UE comprises:
   measuring one or more D2D communication parameters; and
   determining that at least one of the one or more D2D communication parameters is below a D2D communications threshold.

9. The method of claim 1, wherein the first UE is designated as a controlling UE for the D2D communication link with the second UE.

10. An apparatus for communication, comprising:
   means for performing, by a first user equipment (UE), communications with a second UE using an internet protocol (IP) multimedia subservice (IMS) session in which data traffic and signaling traffic are supported through a network;
   means for determining that the second UE is within a first proximity threshold of the first UE;
   means for establishing a device-to-device (D2D) communication link with the second UE and sending a message from the first UE to the second UE through a signaling traffic communication path of the network to remove a network supported data path between the first UE and the second UE; and
   means for transferring, by the first UE, support of the data traffic to the D2D communication link while continuing to maintain support of the signaling traffic of the IMS session through the network after the establishing of the D2D communication link with the second UE and the transferring of the support of the data traffic to the D2D communication link.

11. The apparatus of claim 10, wherein the means for determining is further configured to determine that the second UE is farther than a second proximity threshold from the first UE and wherein the means for transferring is further configured to return the data traffic to be supported through the network.

12. The apparatus of claim 10, wherein the first proximity threshold between the first and second UEs comprises one of a distance between the first and second UEs, a signal strength of the second UE measured by the first UE, or a signal quality of the second UE measured by the first UE.

13. The apparatus of claim 11, wherein the second proximity threshold between the first and second UEs comprises one of a distance between the first and second UEs, a signal strength of the second UE measured by the first UE, or a signal quality of the second UE measured by the first UE.

14. The apparatus of claim 10, wherein the signaling traffic includes Session Initiation Protocol (SIP) signaling.

15. The apparatus of claim 10, wherein the means for establishing the D2D communication link is further configured to:
   receive a message from the network prompting the first and second UEs to establish the D2D communication link.

16. The apparatus of claim 10, wherein the means for determining is further configured to:
   determine that the first and second UEs use a common serving cell; or
   determine that the first and second UEs use nearby serving cells.

17. The apparatus of claim 11, wherein the means for determining is further configured to:
   measure one or more D2D communication parameters; and
   determine that at least one of the one or more D2D communication parameters is below a D2D communications threshold.

18. The apparatus of claim 10, wherein the first UE is designated as a controlling UE for the D2D communication link with the second UE.

19. An apparatus for wireless communication, comprising:
   a processing system configured to:
      perform, by a first user equipment (UE), communications with a second UE using an internet protocol (IP) multimedia subservice (IMS) session in which data traffic and signaling traffic are supported through a network;
      determine that the second UE is within a first proximity threshold of the first UE;
      establish a device-to-device (D2D) communication link with the second UE and send a message from the first UE to the second UE through a signaling traffic communication path of the network to remove a network supported data path between the first UE and the second UE; and
      transfer, by the first UE, support of the data traffic to the D2D communication link while continuing to maintain the support of the signaling traffic of the IMS session through the network after the establishing of the D2D communication link with the second UE and the transferring of the support of the data traffic to the D2D communication link.

20. The apparatus of claim 19, wherein the processing system is configured to:
   determine that the second UE is farther than a second proximity threshold from the first UE; and
   return the data traffic to be supported through the network.

21. The apparatus of claim 19, wherein the first proximity threshold between the first and second UEs comprises one of a distance between the first and second UEs, a signal strength of the second UE measured by the first UE, or a signal quality of the second UE measured by the first UE.

22. The apparatus of claim 20, wherein the second proximity threshold between the first and second UEs comprises one of a distance between the first and second UEs, a signal strength of the second UE measured by the first UE, or a signal quality of the second UE measured by the first UE.

23. The apparatus of claim 19, wherein the signaling traffic includes Session Initiation Protocol (SIP) signaling.

24. The apparatus of claim 19, wherein the processing system is configured to:
   receive a message from the network prompting the first and second UEs to establish the D2D communication link.

25. The apparatus of claim 19, wherein the processing system is configured to determine at least one of:
   that the first and second UEs use a common serving cell; or
   that the first and second UEs use nearby serving cells.

26. The apparatus of claim 20, wherein the processing system is configured to:
   measure one or more D2D communication parameters; and
   determine that at least one of the one or more D2D communication parameters is below a D2D communications threshold.

27. The apparatus of claim 19, wherein the first UE is designated as a controlling UE for the D2D communication link with the second UE.

28. A non-transitory computer-readable medium storing computer executable code for wireless communication, comprising code for:
  performing, by a first user equipment (UE), communications with a second UE using an internet protocol (IP) multimedia subservice (IMS) session in which data traffic and signaling traffic are supported through a network;
  determining that the second UE is within a first proximity threshold of the first UE;
  establishing a device-to-device (D2D) communication link with the second UE and sending a message from the first UE to the second UE through a signaling traffic communication path of the network to remove a network supported data path between the first UE and the second UE; and
  transferring, by the first UE, support of the data traffic to the D2D communication link while continuing to maintain the support of the signaling traffic of the IMS session through the network after the establishing of the D2D communication link with the second UE and the transferring of the support of the data traffic to the D2D communication link.

29. The computer-readable medium of claim 28, further comprising code for:
  determining that the second UE is farther than a second proximity threshold from the first UE; and
  returning the data traffic to be supported through the network.

30. The computer-readable medium of claim 28, wherein the first proximity threshold between the first and second UEs comprises one of a distance between the first and second UEs, a signal strength of the second UE measured by the first UE, or a signal quality of the second UE measured by the first UE.

31. The computer-readable medium of claim 29, wherein the second proximity threshold between the first and second UEs comprises one of a distance between the first and second UEs, a signal strength of the second UE measured by the first UE, or a signal quality of the second UE measured by the first UE.

32. The computer-readable medium of claim 28, wherein the signaling traffic includes Session Initiation Protocol (SIP) signaling.

33. The computer-readable medium of claim 28, further comprising code for:
  receiving a message from the network prompting the first and second UEs to establish the D2D communication link.

34. The computer-readable medium of claim 28, further comprising code for at least one of:
  determining that the first and second UEs use a common serving cell; or
  determining that the first and second UEs use nearby serving cells.

35. The computer-readable medium of claim 29, further comprising code for:
  measuring one or more D2D communication parameters; and
  determining that at least one of the one or more D2D communication parameters is below a D2D communications threshold.

36. The computer-readable medium of claim 28, wherein the first UE is designated as a controlling UE for the D2D communication link with the second UE.

* * * * *